(12) United States Patent
Fiechtner et al.

(10) Patent No.: US 7,534,334 B1
(45) Date of Patent: May 19, 2009

(54) APPARATUS AND METHOD FOR CONCENTRATING AND FILTERING PARTICLES SUSPENDED IN A FLUID

(75) Inventors: Gregory J. Fiechtner, Bethesda, MD (US); Eric B. Cummings, Livermore, CA (US); Anup K. Singh, Danville, CA (US)

(73) Assignee: Sandia Corporation, Livermore, CA (US)

( * ) Notice: Subject to any disclaimer, the term of this patent is extended or adjusted under 35 U.S.C. 154(b) by 864 days.

(21) Appl. No.: 10/956,446

(22) Filed: Sep. 30, 2004

Related U.S. Application Data

(60) Provisional application No. 60/508,480, filed on Oct. 3, 2003.

(51) Int. Cl.
  *B01D 57/02* (2006.01)
  *B01L 11/00* (2006.01)
  *B01D 59/42* (2006.01)
(52) U.S. Cl. .................. 204/547; 204/451; 422/99; 422/100; 422/101; 422/102; 436/180
(58) Field of Classification Search .................. None
  See application file for complete search history.

(56) References Cited

U.S. PATENT DOCUMENTS

| | | | | |
|---|---|---|---|---|
| 3,773,646 | A * | 11/1973 | Mandle et al. | 204/620 |
| 5,234,594 | A * | 8/1993 | Tonucci et al. | 210/500.26 |
| 5,957,579 | A * | 9/1999 | Kopf-Sill et al. | 366/340 |
| 5,972,187 | A * | 10/1999 | Parce et al. | 204/453 |
| 6,270,641 | B1 * | 8/2001 | Griffiths et al. | 204/451 |
| 2003/0010637 | A1 | 1/2003 | Cummings | 204/547 |
| 2003/0230489 | A1 | 12/2003 | Cummings et al. | 204/454 |
| 2004/0026250 | A1 | 2/2004 | Cummings et al. | 204/547 |

OTHER PUBLICATIONS

Fiechtner, G. J.; and Cummings, E. B.; "Low- Dispersion Electrokinetic Flows for Expanded Separation Channels in Microfluidic Systems: Multiple Faceted Interfaces," *Journal of Chromatography A*, v.1027(1-2), pp. 245-257, Feb. 20, 2004.

(Continued)

*Primary Examiner*—Maureen M Wallenhorst
*Assistant Examiner*—Neil Turk
(74) *Attorney, Agent, or Firm*—Timothy P. Evans

(57) ABSTRACT

Disclosed is a device for separating and concentrating particles suspended in a fluid stream by using dielectrophoresis (DEP) to trap and/or deflect those particles as they migrate through a fluid channel. The method uses fluid channels designed to constrain a liquid flowing through it to uniform electrokinetic flow velocities. This behavior is achieved by connecting deep and shallow sections of channels, with the channel depth varying abruptly along an interface. By careful design of abrupt changes in specific permeability at the interface, an abrupt and spatially uniform change in electrokinetic force can be selected. Because these abrupt interfaces also cause a sharp gradient in applied electric fields, a DEP force also can be established along the interface. Depending on the complex conductivity of the suspended particles and the immersion liquid, the DEP force can controllably complement or oppose the local electrokinetic force transporting the fluid through the channel allowing for manipulation of particles suspended in the transporting liquid.

15 Claims, 18 Drawing Sheets

OTHER PUBLICATIONS

Lapizco-Encinas, B. H.; Simmons, B. A.; Cummings, E. B.; and Fintschenko, Y., "Dielectrophoretic Concentration and Separation of Live and Dead Bateria in an Array of Insulators," *Analytical Chemistry*, v.76(6), pp. 1571-1579, Mar. 15, 2004.

Lapizco-Encinas, B. H.; Simmons, B. A.; Cummings, E. B.; and Fintschenko, Y., "Insulator-Based Dielectrophoresis for the Selective Concentration and Separation of Live Bacteria in Water," *Electrophoresis*, v.25(10-11), pp. 1695-1704, Jun. 2004.

Cummings, E. B.; and Singh, A. K.; "Dielectrophoresis in Microchips Containing Arrays of Insulating Posts: Theoretical and Experimental Results," *Analytical Chemistry*, v.75(18), pp. 4724-4731, Sep. 15, 2003.

Fiechtner, G. J.; and Cummings, E. B.; "Faceted Design of Channels for Low-Dispersion Electrokinetic Flows in Microfluidic Systems," *Analytical Chemistry*, v.75(18), pp. 4747-4755, Sep. 15, 2003.

Suehiro, J.; Zhou, G.; Imamura, M.; and Hara, M.; "Dielectrophoretic Filter for Separation and Recovery of Biological Cells in Water," *IEEE Transactions on Industry Applications*, v.39(5), pp. 1514-1521, Sep./Oct. 2003.

Chou, C.-F.; and Zenhausern, F.; "Electrodeless Dielectrophoresis for Micro Total Analysis Systems," *IEEE Engineering in Medicine and Biology Magazine*, v.22(6), pp. 62-67, Nov./Dec. 2003.

Singh, A. K.; Cummings, E. B.; and Throckmorton, D. J.; "Fluorescent Liposome Flow Markers for Microscale Particle-Image Velocimetry," *Analytical Chemistry* v.73(5), pp. 1057-1061, Mar. 1, 2001.

Cummings, E. B., "An Image Processing and Optimal Nonlinear Filtering Technique for Particle Image Velocimetry of Microflows", *Experiments in Fluids* v.29, pp. S42-S50, 2000.

Wakeman, R. J.; and Butt, G.; "An Investigation of High Gradient Dielectrophoretic Filtration," *Chemical Engineering Research and Design*, v.81, pp. 1514-1521, 2003.

* cited by examiner

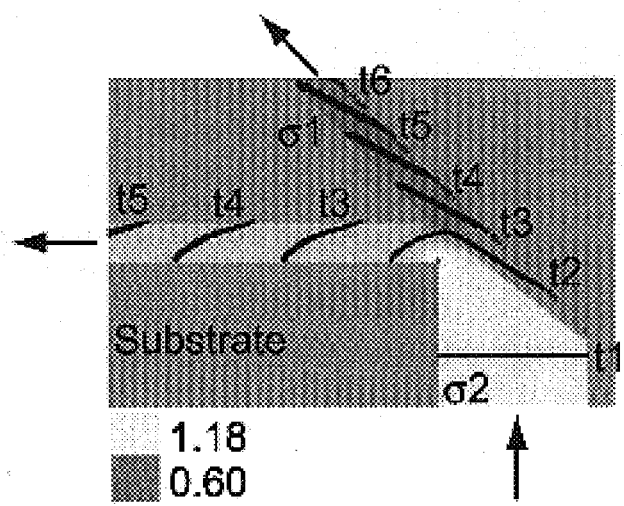
*FIG. 14*
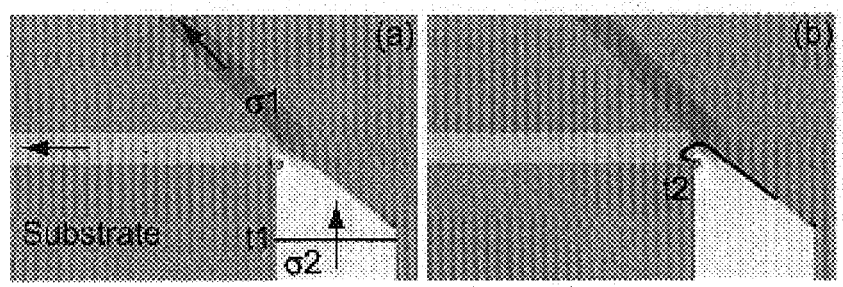
*FIG. 15A*   *FIG. 15B*

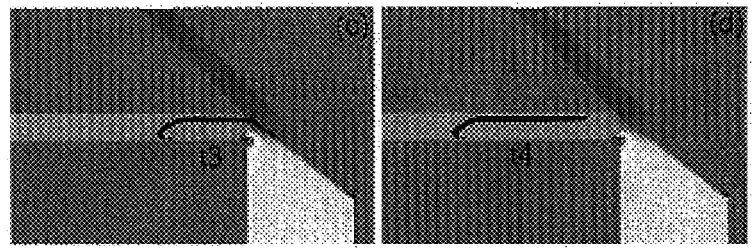
FIG. 15C    FIG. 15D
FIG. 15E    FIG. 15F
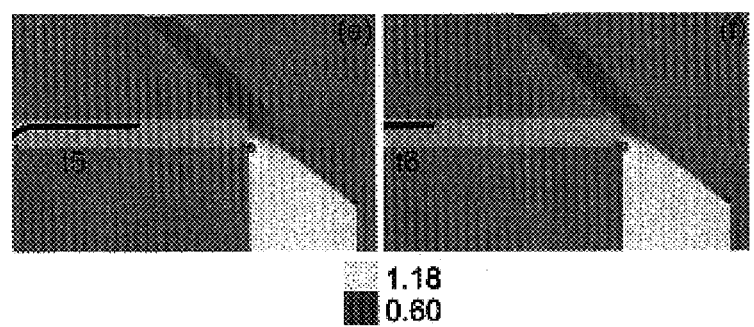
1.18
0.60

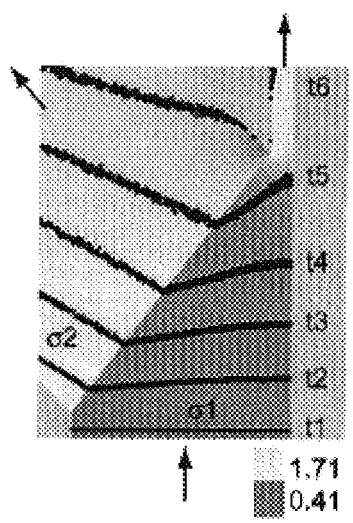
FIG. 16
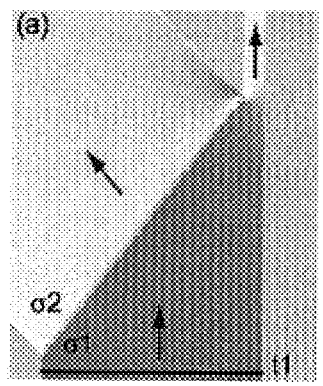 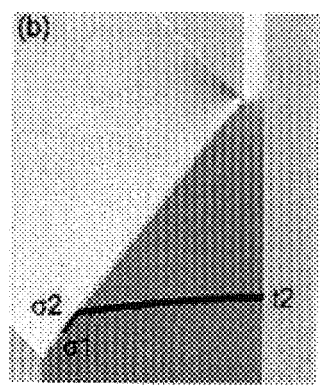 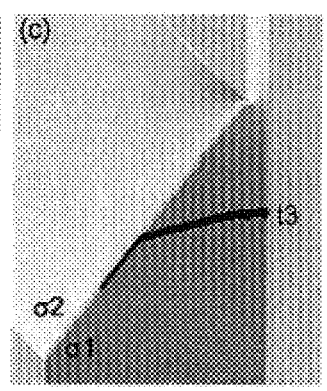
FIG. 17A    FIG. 17B    FIG. 17C

APPARATUS AND METHOD FOR CONCENTRATING AND FILTERING PARTICLES SUSPENDED IN A FLUID

CROSS REFERENCE TO RELATED APPLICATIONS

This application claims priority to prior provisional U.S. Patent Application Ser. No. 60/508,480 originally filed Oct. 3, 2003 entitled "METHOD AND APPARATUS FOR CONCENTRATING AND FILTERING PARTICLES SUSPENDED IN A FLUID".

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND

As described in prior, commonly owned U.S. application Ser. Nos. 09/886,165, and 10/176,322, now issued as U.S. Pat. Nos. 7,104,747 and 7,204,923, respectively, and herein incorporated by reference, dielectrophoresis (hereinafter "DEP") can be used to concentrate and filter particles suspended in a fluid. The dielectrophoretic force is produced by the action of an electric field gradient on a charge separation in particles suspended in an immersion liquid. This force is proportional to the real part of the relative difference in the complex conductivities of the particle and immersion liquid, and the square of the applied electric field. We have shown that insulators are practical and advantageous objects to produce the spatially non-uniform electric fields required for DEP.

More particularly, DEP is the motion of particles toward or away from regions of high electric field intensity. When an external electric field is applied to a system consisting of a particle suspended in a fluid medium, charges are induced to appear at the particle-fluid interface so as to confer on this polarized particle the properties of an electric dipole. The electrostatic potential of a polarizable particle is minimized in regions of highest electric field intensity. If the particles are immersed in a polarizable fluid, the electrostatic energy of the system is minimized by placing the most polarizable component in the high-field regions. If the particle is more polarizable than the fluid, it will be impelled toward a region of high field intensity (positive dielectrophoresis) or otherwise toward a region of lower field intensity (negative dielectrophoresis). The polarization of particles occurs by a variety of mechanisms having characteristic relaxation times. In DEP, the force on a particle and its surrounding medium is proportional to the gradient of the field intensity and is independent of the direction of the electric field. This is in contrast to electrophoresis, the field induced motion of charged particles, wherein the direction of the force on a particle is dependent upon the sign of the charge and the direction of the field.

We have also previously described a "faceted prism" method in commonly owned U.S. application Ser. No. 10/456,772, now issued as U.S. Pat. No. 7,005,301, entitled "Piecewise Uniform Conduction-like Flow Channels and Method Therefor", and herein incorporated by reference. This "faceted prism" method describes a method for designing flow channels with uniform velocities throughout an electrokinetic flow field. The velocities remain uniform while turning and expanding channel flows to any value of turning angle and channel width. This is achieved by connecting deep and shallow sections of channels, wherein the channel depth varies abruptly along the interface between the adjoining sections in a ratio range of about 1:2 to about 1:1000. The method enables the selection of channel velocity in the shallow region relative to the velocity in the deep section. For ideal electrokinetic flows, the electrokinetic force on particles in the channel varies in direct proportion to the local channel velocity. Just as the velocity in each channel section is uniform, so is the electrokinetic force on a fluid particle uniform in each channel section. Therefore, by careful design of abrupt changes in specific permeability at an interface, the abrupt change in electrokinetic force can be selected. The desirable uniform velocity sections can also be designed to work with non-electrokinetic forces such as pressure-driven systems with Hele-Shaw designs. Moreover, combinations of fluid pumping methods such as electrokinetic and pressure-based devices can also be used to achieve the desired effect.

Because the abrupt interfaces also cause a sharp gradient in an applied electric field, a DEP force is established along the interface. Depending on the polarizability of the suspended particles, the DEP force can either complement or oppose the local electrokinetic force transporting the fluid through the channel. Moreover, for a transition in depth from deep to shallow channels, the DEP force will be the opposite of that for an abrupt transition in depth from shallow channels to deep channels.

SUMMARY

The devices described herein, therefore, use these channel interfaces to deflect selected particles from the bulk liquid flow, producing regions where particles are either selectively concentrated or selectively rarefied. Moreover, the device can be used to manipulate particles (more properly particles with specific electrical properties), moving them to specific locations within a fluid system or on a chip-based device. Particles are therefore redirected from the fluid flow such that they can be isolated and immobilized until needed and then moved for further processing. Furthermore, unlike prior art batch concentrators that work by sequentially immobilizing and releasing particles, the designs of the present invention can perform their filtration/concentration function on a continuous basis, allowing the channel to continue flowing.

The concentrator/filter devices of this invention are well suited to fabrication by several well-known methods including but not limited to primary lithographic techniques such as LIGA or deep reactive ion etching techniques, and secondary techniques such as hot-embossing or stamping from an etched master die tool. A preferred method of fabrication of devices or dies is a two-level isotropic wet etch of glass. In this method, one etch produces the flow channels (or channel walls if the substrate is to be used as a die) while the second etch modulates the depth of the channel floor.

The following sections discuss the operation and detail embodiments of faceted dielectrophoretic systems. The manipulation of particles in these devices involves a competition between dielectrophoretic force fields that draw particles toward dielectrophoretic potential wells and repel particles from dielectrophoretic potential barriers and "mobilization fields" that move the particles through the system with a bulk flow. Depending on the competing transport mechanism, the mobilization field may be, but is not limited to, an electric field as in the case of electrokinesis, a pressure field in the case of advection, an inertial or gravitational force field in the case of sedimentation or buoyancy, a magnetic field in the case of magnetophoresis, or any combination of these or similar fields. No distinction need be made between an electric field that drives electrokinesis and dielectrophoresis except that the field waveform must have a spectral component near-zero-frequency (D.C.) to produce a significant particle displacement by electrokinesis.

BRIEF DESCRIPTION OF THE DRAWINGS

FIG. 14 shows a simulated flow of particles, under conditions where DEP is negligible, through an alternative splitter design having a concentration channel added to a 45° turn region, wherein the entrance region is shallow ($\sigma_2$) while the 45° turn region is deep ($\sigma_1$).

FIGS. 15A-15F show a simulated flow of particles at time instants t1-t6, under conditions where particles undergo appreciable positive DEP, through the splitter design of FIG. 14 (wherein the entrance region is shallow ($\sigma_2$) and the 45° turn region is deep ($\sigma_1$)) that further includes a concentration channel added to a 45° turn region. Particles are seen unable to pass over the interface between shallow and deep regions, directed instead into the concentration channel.

FIG. 16 shows a simulated flow of particles at time instants t1-t6, under conditions where DEP is negligible, through a second alternate splitter design having a concentration channel added to a 45° turn region, wherein the entrance region is deep ($\sigma_1$) and the 45° turn region is shallow ($\sigma_2$).

FIGS. 17A-17F show a simulated flow of particles at time instants t1-t6, under conditions where particles undergo appreciable negative DEP, through the splitter design of FIG. 16 (wherein the entrance region is deep ($\sigma_1$) and the 45° turn region is shallow ($\sigma_2$)). Particles are seen to travel slowly parallel to the interface where they eventually pass into and through the concentration channel.

DETAILED DESCRIPTION OF THE EMBODIMENTS

Figure 1A:
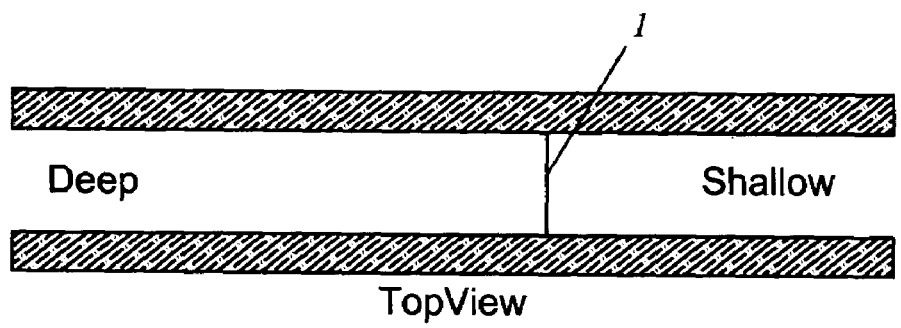
FIGS. 1A and 1B illustrate the abrupt change in channel depth that produces the electric field gradient necessary to affect particle filtering and concentration.

A distinct advantage of the concentrator filter lies in the use of substantially uniform velocity-field channels. One possible method for achieving these fields relies on the use of faceted prisms as disclosed and described in commonly owned, co-pending U.S. patent application Ser. No. 10/456,772. Here, channels are designed using the two-level geometry shown in FIG. 1, as we have described previously.

As used in this specification, the term "particle" refers generally to biological as well as non-biological matter that can be in the size range of from about 5 nm to about 200 µm, such as proteins, DNA, RNA, molecules and assemblages of molecules such as polymerase chain reaction ("PCR") inhibitors, toxins, biotoxins and explosive residues, viruses, plasmids, vesicles, liposomes, bacteria, cells or assemblages of cells, spores, protozoa, embryos, or other small organisms, minerals, soot, dust, crystals, micelles of a colloid emulsion or a phase separation product, gas bubbles, and structures such as nano-tubes and nano-rods. Also of interest are airborne particles such as diesel emissions, rubber, fibers (especially asbestos fibers), metals, oxides of metals, and soils. The term "separation" is used to describe a process by which particles contained within a fluid are filtered, concentrated, immobilized, retarded, or advanced relative to the bulk fluid or other dissimilar particles. An "applied electric field" relates to the electric field produced by applying a voltage to electrodes in communication with the dielectrophoretic flow system.

In order to better understand the embodiments of the invention, the following discussion is provided. However, it is to be understood that strict adherence to the following theory is not necessary for the functional operation of the present invention. The theory is provided only for illustrative purposes in order to help explain the operation of the devices of this invention. While faceted channels are shown with interfaces having specific angles in reality, any curb-like discontinuity would have similar utility so long as velocity and electric fields are maintained substantially uniform across that interface.

For "ideal" systems the design rules used to describe flow passing across an abrupt change in cross-sectional area result from the theory of ideal electrokinetic flow. Direct numerical simulation of electrokinetic flows requires solution of the Navier-Stokes, species-transport, and electric-field equations that are coupled through the charge density, which is generally unknown. Moreover, the relevant length scales span about seven orders of magnitude. Fortunately, "similitude" exists for most cases of interest, such that the velocity field can be computed directly from the Laplace equation without the need to solve the continuity and momentum equations. Similitude applies under the following conditions:

The electric field is steady;

fluid properties are uniform;

channel boundaries are uniform, insulating, and impermeable;

the electric Debye layer is thin compared to any physical dimension; and the fluid velocities on all inlet and outlet boundaries satisfy the Helmholtz-Smoluchowski relation normally applicable to fluid-solid boundaries.

Figure 1B:
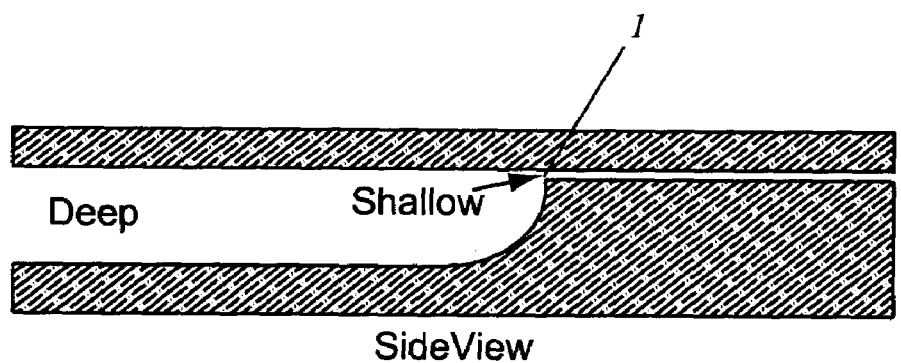
Figure 2:
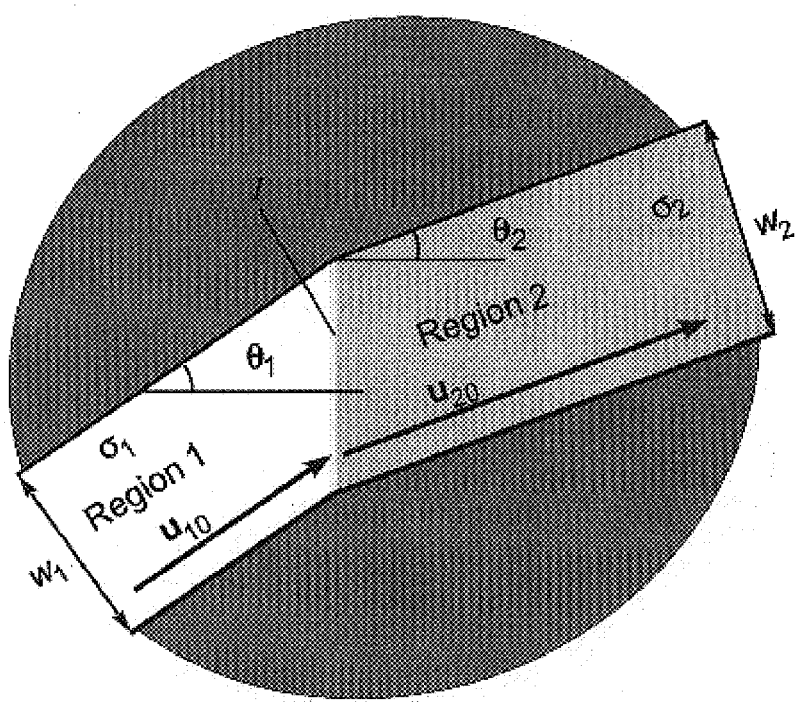
FIG. 2 shows a top view of the rotated interface that can be used to affect particle filtering and concentration, along with related nomenclature.

For these conditions, the velocity u (m/s) of the conduction fluid is everywhere proportional to the electric field E (V/m) such that:

$$u = \mu E, \tag{1a}$$

where the coefficient $\mu$ is the mobility of the fluid and has dimension of $m^2 V^{-1} s^{-1}$. The mobility and the fluid conductivity are assumed to be constant everywhere. The fluid flux per unit width j is proportional to the conduction velocity by:

$$j = \sigma u, \tag{1b}$$

where $\sigma$ is defined as the "conductance" or "permeability" of the conduction channel, which is permitted to vary across a straight interface in this analysis. While the terms "conductance" and "permeability" are intended herein to have the same meaning and may be used, therefore, interchangeably, this property will be referred to hereinafter as the "permeability" of the conduction channel. These semantics are correct physically for ideal electrokinesis and other forms of conduction in which the local flow velocity is independent of medium permeability. Furthermore, FIG. 1A and FIG. 1B show an example of a subscale design that modifies the permeability of a channel. In a quasi-planar microsystem, the permeability of a channel, as defined in Equation 1b, is proportional to the channel depth. A two or more level etched microsystem, for example, can be used to implement the designs as in FIG. 1A and FIG. 1B. Alternatively, the effective permeability of a channel can be lowered with respect to an open channel by blocking part of the channel; for example by filing the channel with a secondary structure such as an array of posts or channel-aligned parallel columns. As we have previously noted, interface 1 shown in FIG. 1 can take on any angle, as demonstrated in FIG. 2, for which we can write:

$$\frac{\tan\theta_1}{\sigma_1} = \frac{\tan\theta_2}{\sigma_2}, \tag{2}$$

and $$u_{10} \sin\theta_1 = u_{20} \sin\theta_2, \tag{3}$$

where $u \equiv \|u\|$ and where $\theta_1$ and $\theta_2$ are the flow angles shown in FIG. 2.

Equation 2 is similar in appearance to Snell's law of refraction, except that tangents of the propagation angles are matched instead of sines. Equation 3 describes how the speed of the fluid flow varies across the interface. Equations 2 or 3 can be considered compatibility conditions for two-dimensional flow in regions 1 and 2 such that if a conduction-channel interface is designed to satisfy Equation 2, the flow everywhere in region 1 will have a uniform velocity $u_{10}$ and region 2 will have a uniform flow velocity of $u_{20}$. This case produces the minimum hydrodynamic dispersion within regions 1 and 2 as given by Equation 3. The channel turns the flow velocity at the interface by an amount equaling $\theta_1 - \theta_2$. Having established a uniform velocity everywhere, we note that the electrokinetic velocity is related from similitude by Equation 1a.

For the purpose of an analysis, we adopt a coordinate system $\{x, y, z\}$ in which the faceted interfaces represent channel depth changes in the z-direction that run parallel to the y-direction (normal to the x-direction) in the region of interest.

Now, the dielectrophoretic mobility of a particle, $\mu_{DEP}$, can be defined as:

$$u_{DEP} = \mu_{DEP} \nabla(E \cdot E), \tag{4}$$

and is known to be a function of particle geometry, and the difference between the conductivity of the particle and that of the medium in which it is suspended (a combination of conductivity and polarizability) at the applied-electric-field frequency.

If we assume a form for the electric potential, $\phi$, such that:

$$\phi = E_x \phi_0(x,z) + E_y y, \tag{5}$$

then the electric field is given by:

$$E = \nabla \varphi = E_x \frac{\partial \varphi_0}{\partial x} e_x + E_y e_y + E_x \frac{\partial \varphi_0}{\partial z} e_z. \tag{6}$$

As noted above for conditions of ideal electrokinetic flows, the potential $\phi$ must satisfy the Laplace equation, $\nabla^2 \phi = 0$, such that:

$$\frac{\partial^2 \varphi_0}{\partial z^2} = -\frac{\partial^2 \varphi_0}{\partial x^2}, \tag{7}$$

and $$\nabla E = E_x \begin{bmatrix} \frac{\partial^2 \varphi_0}{\partial x^2} & 0 & \frac{\partial^2 \varphi_0}{\partial x \partial z} \\ 0 & 0 & 0 \\ \frac{\partial^2 \varphi_0}{\partial x \partial z} & 0 & \frac{\partial^2 \varphi_0}{\partial x^2} \end{bmatrix}, \tag{8}$$

or $$E \cdot \nabla E = \tag{9}$$
$$E_x^2 \left[ \left( \frac{\partial^2 \varphi_0}{\partial z} \frac{\partial \varphi_0}{\partial x} + \frac{\partial \varphi_0}{\partial z} \frac{\partial^2 \varphi_0}{\partial x \partial z} \right) e_x + \left( \frac{\partial \varphi_0}{\partial x} \frac{\partial \varphi_0}{\partial x \partial z} + \frac{\partial \varphi_0}{\partial z} \frac{\partial^2 \varphi_0}{\partial x^2} \right) e_z \right],$$

for which we define g(x,z) and h(x,z) such that:

$$E \cdot \nabla E \equiv E_x(g(x,z)e_x + h(x,z)e_z). \quad (10)$$

The second term in Equation 10 is responsible for dielectrophoretic transport toward the channel surfaces (top or bottom). The first term in Equation 10 is responsible for dielectrophoretic transport that inhibits the motion of particles across a faceted interface. The corresponding x-velocity component, $u_{DEP}$, is:

$$u_{DEP}(x,z) = u_{DEP} 2E_x^2 g(x,z). \quad (11)$$

If we require $\int(\partial\phi_0/\partial x)dz = 1$, then $E_x$ describes the mean electric field in the x-direction. This and the y-directed component from Equation 2, $E_y$, combine as vectors to form the complete mean electric field E, thus $E_x = |E| \cos \theta$.

If a particle's dielectrophoresis successfully opposes electrokinesis at any location (x, z), i.e., $$u_{DEP}/u_{EK} = 2(u_{DEP}/u_{EK}) |E| \cos \theta g(x,z)/(\partial\phi_0/\partial x) < -1, \quad (12)$$

the particle is inhibited from crossing the interface. The ratio $u_{DEP}/u_{EK}$ is particle specific, thus this inhibition is selective. The inhibition can also be tuned by adjusting the magnitude of the applied field at run time. The inhibition can similarly be tuned by adjusting the incidence angle, $\theta$, of the channel interface at the time the flow channel is being designed.

Figure 3:
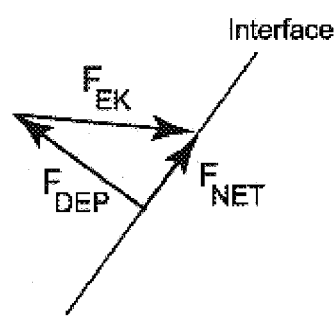
FIG. 3 illustrates a vector diagram demonstrating the net forces that can propel a particle along an interface.

Finally, the function $g(x,z)/(\partial\phi_0/\partial x)$ depends on the geometry of the interface, which is typically dictated by the method of fabrication. If the depth-wise electric field component introduced by the interfaces can be ignored, i.e., if the field is substantially uniform, Equation 7 simplifies to:

$$2(u_{DEP}/u_{EK})|E| \cos \theta (\partial^2\phi_0/\partial x^2) < -1, \quad (13)$$

and provides a means for describing how to design channels that selectively transport particles along faceted interfaces. Therefore, in a substantially uniform flow field the dielectrophoretic behavior of a particle nearing a depth-wise permeability threshold is controlled by a simple cos θ dependency. The design of such systems is extremely simple, as illustrated by the vector diagram shown in FIG. 3, illustrating the balance between dielectrophoretic and electrokinetic forces that can result in a net force to propel a particle along an interface.

There can be a variety of forces for particles as they approach a change in specific permeability:
- An electrokinetic force, $F_{EK}$, as described above. For the special case of faceted prisms, it is possible to control the magnitude of the electrokinetic force on each side of the interface.
- A pressure force, $F_P$. Here, a particle travels in a pressure-driven flow, and local drag pulls the particle toward the interface.
- A sticking force, $F_S$. Here, the attraction between the particle surface and the wall molecules acts to hold the particle near the surface.
- A dielectrophoretic force, $F_{DEP}$, as described above. Depending on the particle, the force direction can be toward or away from an interface.
- A magneto-electric force, $F_{MAG}$.
- A gravitational force, $F_g$.

These forces present many potential design parameters for these devices.

Simulation of Particle Trapping at an Interface

Figures 4A, 4B, 4C:
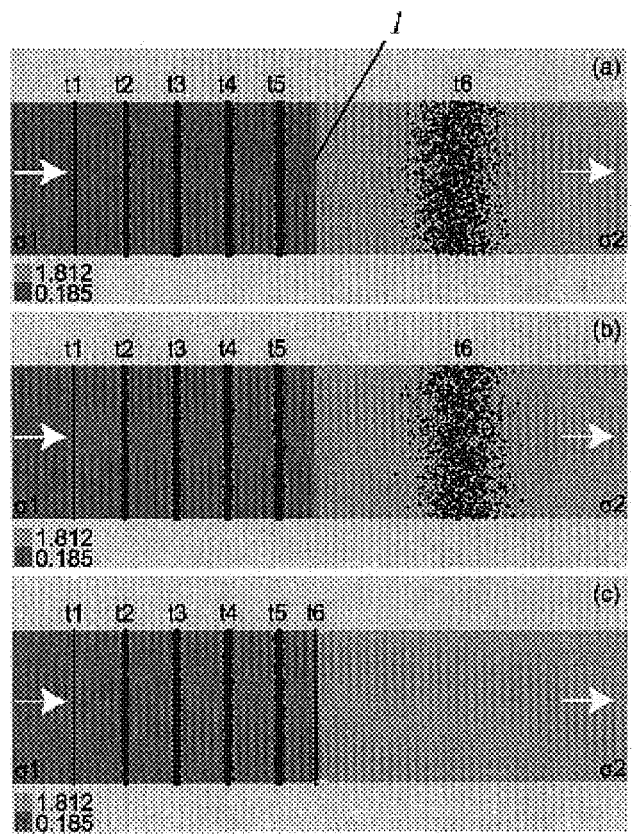
FIG. 4A shows a simulation of particles suspended in a fluid moving through a flow channel, under conditions where DEP is negligible, that encounter an interface normal to their direction of flow where the interface demarks a boundary between an initial deep channel region ($\sigma_1$) and an adjacent shallow channel region ($\sigma_2$).
FIG. 4B shows a simulation of particles suspended in a fluid moving through a flow channel, under conditions where particles undergo appreciable positive DEP, that encounter an interface normal to their direction of flow where the interface demarks a boundary between an initial deep channel region ($\sigma_1$) and an adjacent shallow channel region ($\sigma_2$).
FIG. 4C shows a simulation of particles suspended in a fluid moving through a flow channel, under conditions where particles undergo appreciable negative DEP, that encounter an interface normal to their direction of flow where the interface demarks a boundary between an initial deep channel region ($\sigma_1$) and an adjacent shallow channel region ($\sigma_2$).

A number of simulations of particle behavior in substantially uniform flow-field channels are now presented. Diffusion is included in each simulation, with entrance Peclet numbers chosen from the range about 10 to about 500. FIGS. 4A-C show a grayscale representation of the velocity as flow enters a deep region and exits a shallow region in the direction indication by the arrows. The local relative velocity is given by the grayscale table in the lower left corner of each image. A line of particles is "injected" into the flow at time t1, and tracked as it travels downstream at times t2, t3, t4, t5, and t6. In case of FIG. 4A, there is no dielectrophoresis, such that the particles pass interface 1 without trapping. In the case of FIG. 4B, the particles undergo positive dielectrophoresis. Here, the behavior is identical to that shown in FIG. 4A. In FIG. 4C, particles experience negative dielectrophoresis and are trapped at the interface 1 at time t6. (Note that although considerable diffusive broadening is observed at the same time instants shown in FIGS. 4A and 4B, the combined influence of dielectrophoresis and electrokinetic forcing acts to reduce and broadening from diffusion substantially).

Figures 5A, 5B, 5C:
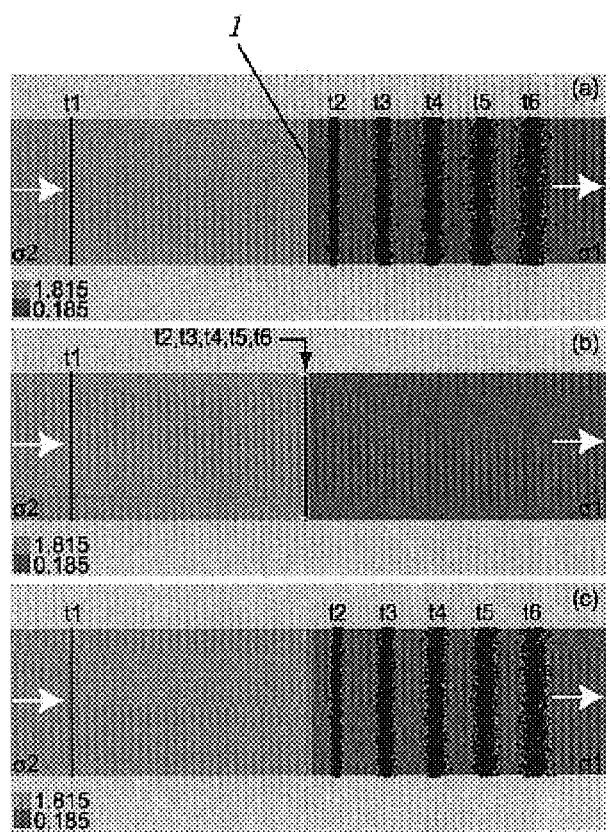
FIG. 5A shows a simulation of particles suspended in a fluid moving through a flow channel, under conditions where DEP is negligible, that encounter an interface normal to their direction of flow where the interface demarks a boundary between an initial shallow channel region ($\sigma_2$) and an adjacent deep channel region ($\sigma_1$).
FIG. 5B shows a simulation of particles suspended in a fluid moving through a flow channel, under conditions where particles undergo appreciable positive DEP, that encounter an interface normal to their direction of flow where the interface demarks a boundary between an initial shallow channel region ($\sigma_2$) and an adjacent deep channel region ($\sigma_1$).
FIG. 5C shows a simulation of particles suspended in a fluid moving through a flow channel, under conditions where particles undergo appreciable negative DEP, that encounter an interface normal to their direction of flow where the interface demarks a boundary between an initial shallow channel region ($\sigma_2$) and an adjacent deep channel region ($\sigma_1$).

However, if the fluid instead enters a shallow region and exits a deep region, the result is the simulations shown FIGS. 5A-5C. As in FIG. 4A the simulation of FIG. 5A again results where dielectrophoresis is negligibly small. Furthermore, the simulations shown in FIGS. 5B and 5C are obtained for particles undergoing positive and negative dielectrophoresis, respectively. In contrast to the results shown in FIGS. 4B and 4C, however, positive dielectrophoresis results in trapping at interface 1, as shown in FIG. 5B, while the case of negative dielectrophoresis shown in FIG. 5C is similar to the image of FIG. 4B where no trapping was observed to occur.

Figure 6A:
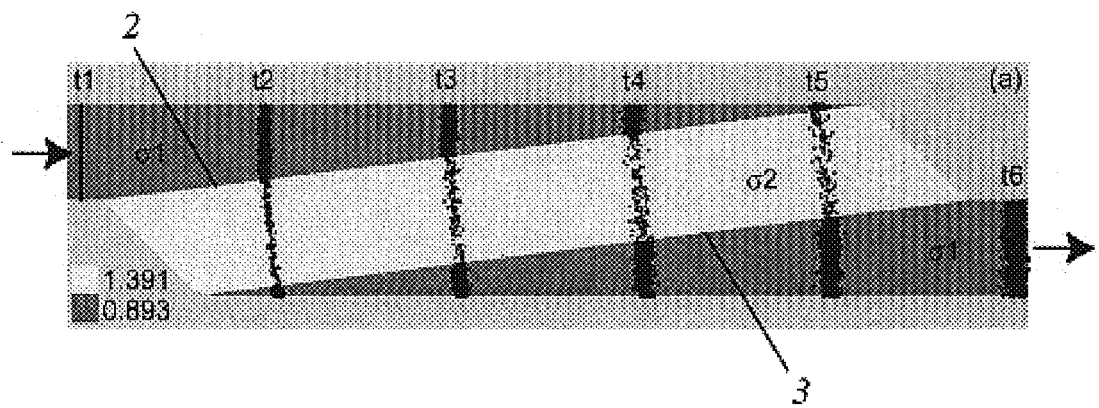
FIG. 6A shows a simulation of particles suspended in a fluid moving through a flow channel, under conditions where DEP is negligible, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).
Figure 6B:
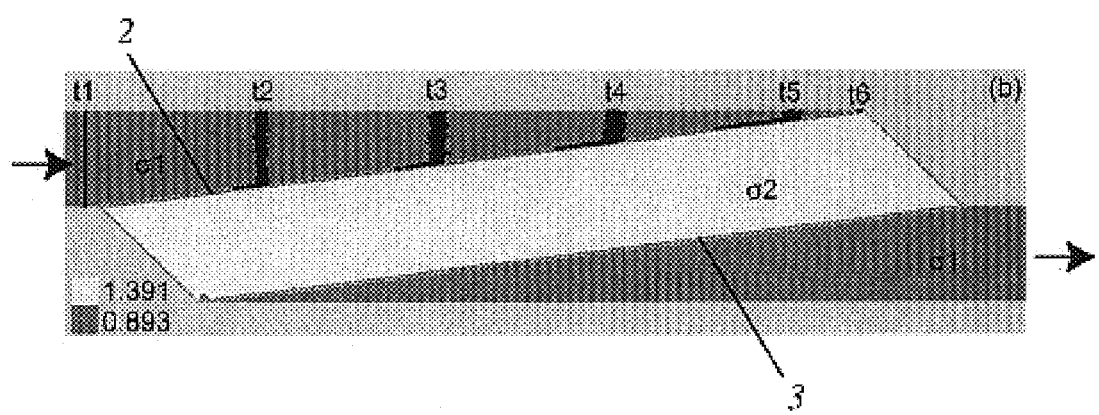
FIG. 6B shows a simulation of particles suspended in a fluid moving through a flow channel, under conditions where particles undergo appreciable negative DEP, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).
Figures 7A, 7B, 7C, 7D, 7E, 7F:
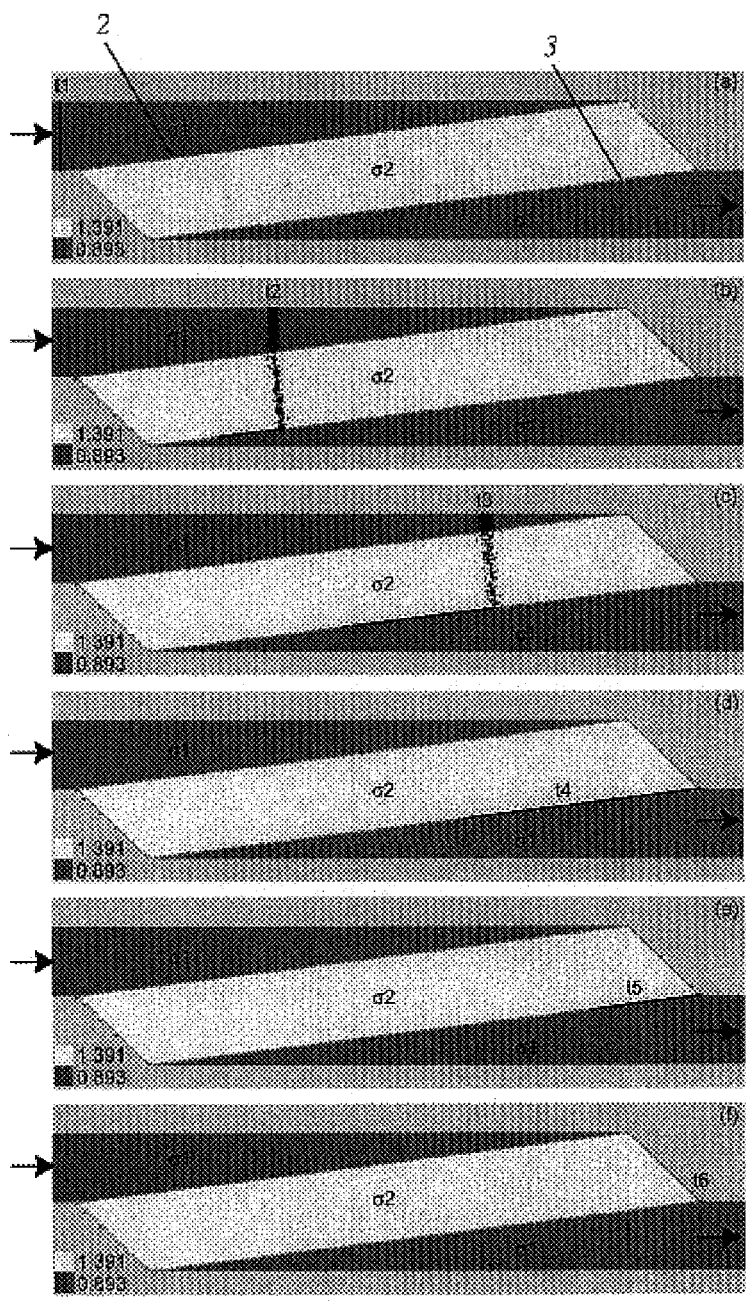
FIGS. 7A-7F show a series of simulations at time instants t1-t6, respectively, of particles suspended in a fluid moving through a flow channel, under conditions where particles undergo appreciable positive DEP, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).

The orientation of interface 1 in FIGS. 4 and 5 is a special case in which the interface angle is normal to the direction of flow. When dielectrophoresis is appreciable, particles are trapped along that interface. For rotated interfaces, however, particles can travel parallel to the interface, as is predicted by the illustration in FIG. 3. A simulation example is shown in FIGS. 6A and 6B, where interface 2 is rotated by an angle, $\theta_1$, of 83° from a plane normal to the flow. In the simulation of FIG. 6A, dielectrophoresis is set to be negligibly small. Particles, injected along a line oriented normal to the direction of flow at time instant t1, and tracked downstream at times t2, t3, t4, t5, and t6, are observed to enter and exit deep regions of the channel as indicated by the arrows. The velocity is uniform in each section, with the shallow region bounded by two parallel interfaces 2 and 3. For the case of negative dielectrophoresis shown in FIG. 6B, particles cannot pass initial interface 2, traveling instead parallel to the interface, immediately before the interface edge. Ultimately, the particles are concentrated in the (deep) corner of the first faceted deep channel region $\sigma_1$ at time t6. The bulk fluid passes out the channel as indicated by the arrow.

Positive dielectrophoresis for the conditions of FIG. 6A can also be simulated, as shown in FIGS. 7A-7F that correspond to time instants t1-t6. Particles pass over interface 2 in FIGS. 7B and 7C, but are influenced by dielectrophoresis upon reaching interface 3 which they are inhibited from crossing (FIGS. 7B-7E). Moreover, the incidence angle of second interface 3 is rotated only slightly, about 10°, with respect to the flow direction in the central, shallow region $\sigma_2$. Therefore, the velocity component in the direction parallel to second interface 3 is small compared to that for the case of FIG. 6B. As a consequence, the particles initially collect along interface 3, followed by motion of the resulting line of particles, which trap at the upper corner in the shallow region $\sigma_2$ at time instant t6.

Figures 8, 9A, 9B, 9C, 9D, 9E:
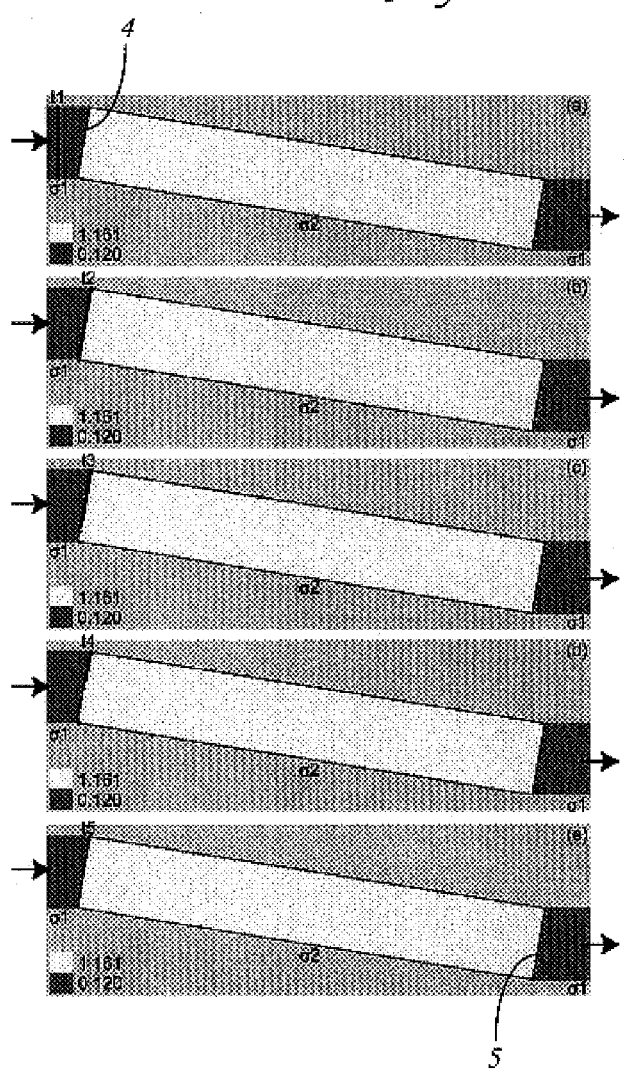
FIG. 8 shows a simulation of particles suspended in a fluid moving through a flow channel, under conditions where DEP is negligible, that encounter an interface at an incidence angle of 10° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).
FIGS. 9A-9E show a series of simulations at time instants t1-t5, respectively, of particles suspended in a fluid moving through a flow channel, under conditions where particles undergo appreciable negative DEP, that encounter an interface at an incidence angle of 10° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).
Figures 10A, 10B, 10C, 10D, 10E, 10F, 10G:
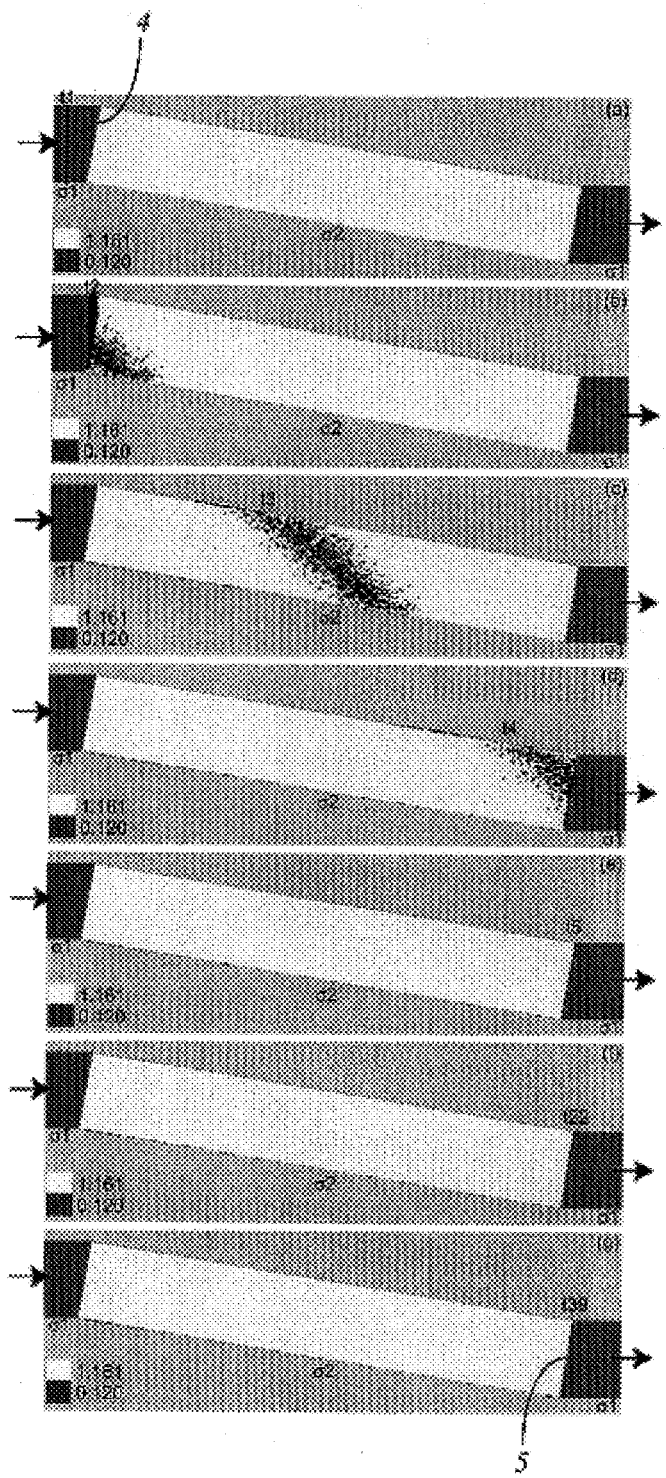
FIGS. 10A-10G show a series of simulations at time instants t1-t5, t22, and t39, respectively, of particles suspended in a fluid moving through a flow channel, under conditions where particles undergo appreciable positive DEP, that encounter an interface at an incidence angle of 10° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$).
Figure 11A:
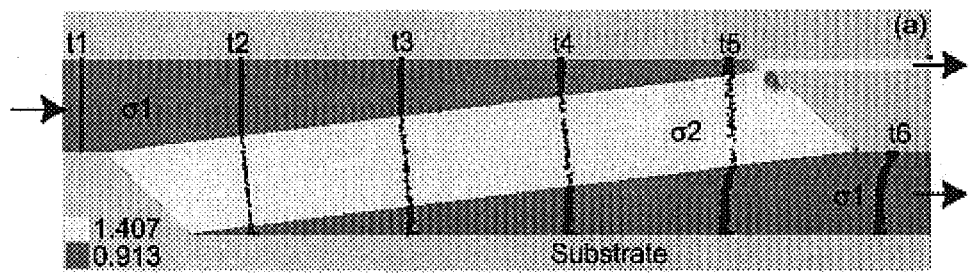
FIG. 11A shows a simulation of particles suspended in a fluid moving through a flow channel, under conditions where DEP is negligible, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$) with an additional concentration channel added to the upper corner of the deep inlet region.
Figure 11B:
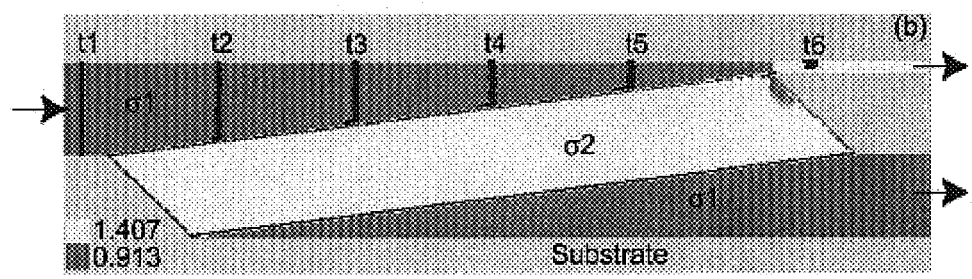
FIG. 11B shows a simulation of particles suspended in a fluid moving through a flow channel, under conditions where particles undergo appreciable negative DEP, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$) with an additional concentration channel added to the upper corner of the deep inlet region.
Figure 12A:
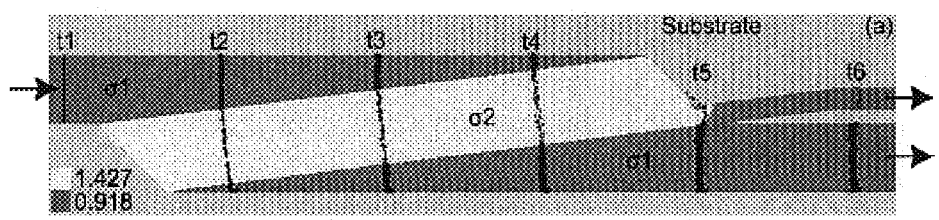
FIG. 12A shows a simulation of particles suspended in a fluid moving through a flow channel, under conditions where DEP is negligible, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$) with an additional concentration channel added to the upper corner of the shallow central region.
Figure 12B:
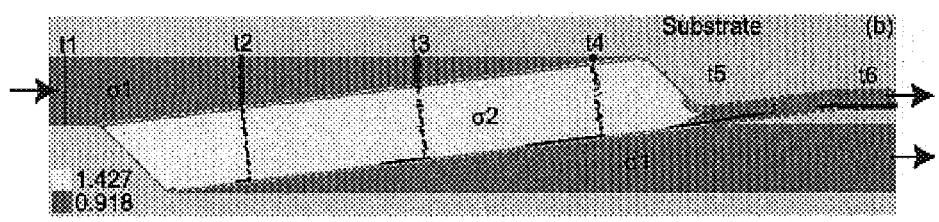
FIG. 12B shows a simulation of particles suspended in a fluid moving through a flow channel, under conditions where particles undergo appreciable positive DEP, that encounter an interface at an incidence angle of 83° to their direction of flow where the interface demarks a boundary between an initial deep channel region ($\sigma_1$) and an adjacent shallow channel region ($\sigma_2$), and where a second interface parallel to the first, is placed downstream to bound the shallow channel region ($\sigma_2$) and demark a second boundary between the shallow channel region ($\sigma_2$) and an adjacent deep channel region ($\sigma_1$) with an additional concentration channel added to the upper corner of the shallow central region.
Figure 13A:
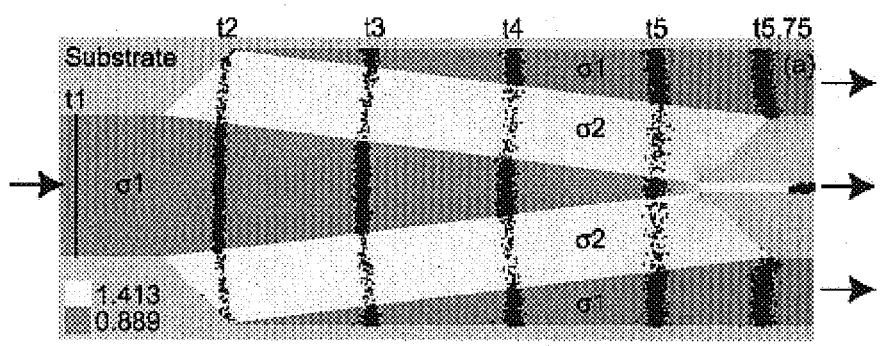
FIG. 13A shows a simulated flow of particles, under conditions where DEP is negligible, in an impedance-matched flow splitter having upper and lower interfaces oriented at an incidence angle of 83° to the direction of particle flow, and an additional concentration channel located in the center between the two faceted channel regions.
Figure 13B:
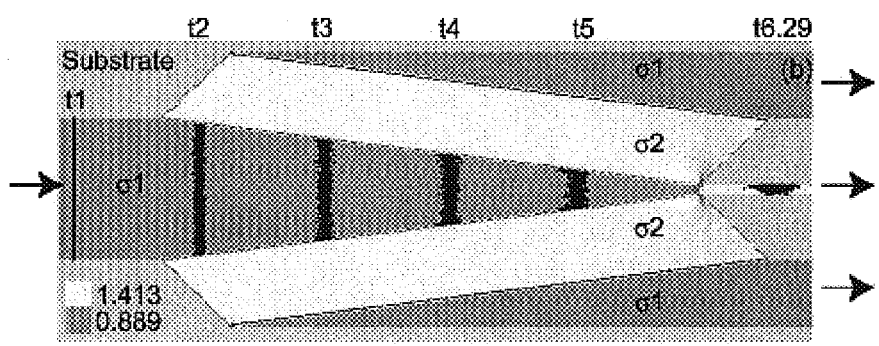
FIG. 13B shows a simulated flow of particles, under conditions where particles undergo appreciable positive DEP, in an impedance-matched flow splitter having upper and lower interfaces oriented at an incidence angle of 83° to the direction of particle flow, and an additional concentration channel located in the center between the two faceted channel regions.
Figures 17D, 17E, 17F:
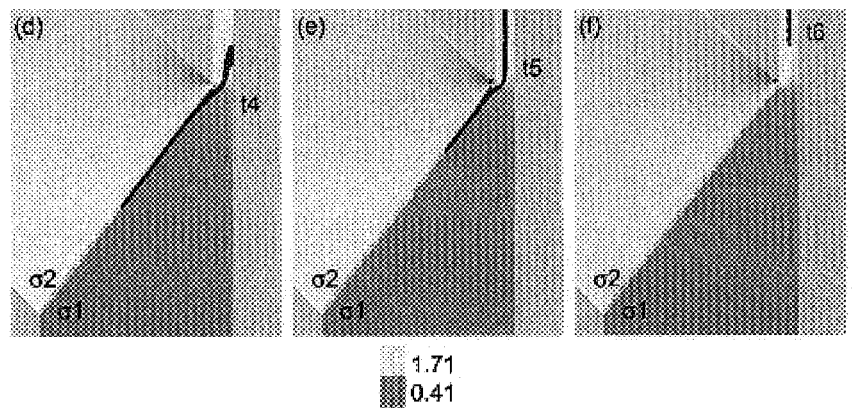

A similar set of simulations was performed for a channel where the interface incidence angles for both first and second interfaces 2 and 3 are smaller than the respective interface angles for the geometry of FIGS. 6 and 7. The simulation depicted in FIG. 8 results for negligibly small dielectrophoresis. Here, particles are injected along a line perpendicular to the direction of flow at time instant t1, and are tracked as they flow downstream at time instants t2, t3, t4, t5, and t6. As shown, the particles pass over both interfaces 4 and 5, and exit the channel.

For the case of negative dielectrophoresis, the particles cannot pass over first interface 4, but are instead shown to gradually travel upward parallel to the first interface and are trapped in the upper left corner of the deep entrance region of the channel "facet". This behavior is shown at time instants t1-t5 in FIGS. 9A-9E, respectively. At time instant t5, the particles concentrate in the upper corner of the deep region $\sigma_1$. The bulk fluid enters and exits the channel in the direction indicated by the arrows.

For positive dielectrophoresis, the simulation of FIGS. 10A-10G results. Particle positions are shown to pass across the first interface from the deep to the shallow region and across the extended shallow region. Upon reaching the end of the shallow region, the particles are shown to travel gradually upward, parallel to the interface, toward the upper right corner of the shallow region. However, while motion parallel to second interface 5 takes place, for this extremely small incidence angle (10°) it is comparatively small. As the final particles are trapped in the upper corner of the shallow region (t39), considerable time has elapsed compared to the simulation shown in FIGS. 9A-9E. To illustrate this delay, the temporal markers are placed on the same temporal scale in FIGS. 9 and 10. Clearly, incidence angle can be chosen to vary the relative speed parallel to an interface. For near-normal incidence, a large amount of particle concentration will occur along the interface as particles gradually flow toward the corner. For extreme incidence angles, particles will rapidly travel parallel to the interface, such that concentration occurs almost exclusively in the vicinity of the corner.

The designs of FIGS. 4-9 may be used in practical devices to separate particles based on trap-and-release strategies. That is, once a desired particle concentration is achieved by trapping—either along a near-normal interface or in a corner—the applied voltage can be adjusted to release the particles downstream.

It is also attractive for continuously operating filters/concentrators to interface with downstream particle diagnostics and/or additional separation systems. Fortunately, for substantially uniform velocity channels, designs are easily modified by installing concentration channels such as are shown in FIGS. 11-17. These channels direct concentrated particle streams away from interface regions. The installation of such channels has a small influence on overall channel behavior using impedance-matched designs.

EXAMPLES

Two preliminary proof-of-concept experiments were performed to validate the foregoing simulations. To do this an aqueous solution was prepared that was modified with a fluorescently tagged solute suspension material. Alternative liquid compositions that can be employed include all liquids in common use, including those that are known to be or are considered as natural carrier media, and those that can be modified to be carrier media. Liquids such as deionized waters, water with an enhanced ion content, seawater, buffers or buffer solutions, blood, serum, urine, saliva, perspiration, acids bases, supercritical fluids, and combinations of the foregoing and insulating fluids such as petroleum distillates, polymers, natural or artificial oils find utility in the present invention. Also useful in the invention are fluids such as beverages, alcohols, vegetable or mineral oils, juices, plant extracts, and food and fermentation broths.

Figure 18:
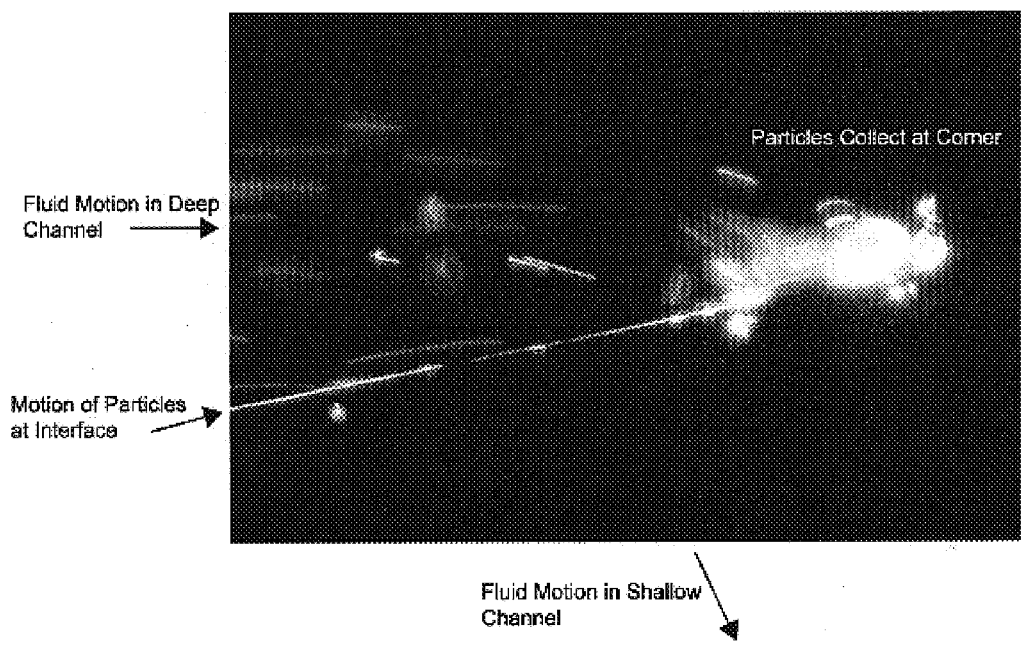
FIG. 18 illustrates experimental results confirming the behavior of particles as they encounter an 83° incidence-angle interface, similar to that simulated in FIG. 6B.

In the example at hand, a liquid suspension was prepared that included a quantity of 1-micron (hereinafter "µm") diameter fluorescent, polystyrene beads mixed into a 0.1 milliMolar (hereinafter "mM") phosphate buffer aqueous solution. The above prepared solution was then introduced into the entrance end of a fluid channel configured as shown in FIG. 6B and constructed from borosilicate glass wherein the "deep" entrance was a 40-µm deep trench and the "shallow" exit was a 4-µm deep trench. Lastly, a DC electric field (100V/mm) was applied between the inlet and outlet ends of the channel in order to achieve conditions where negative DEP redirects the particles. FIG. 18 shows a "black" light photograph showing particle behavior very similar to the predicted results shown in FIG. 6B. In FIG. 18 the 1-µm diameter beads are seen to rapidly travel parallel to the channel 83° internal interface until reaching the upper corner of the channel where they are concentrated and trapped. These particles were later released by reducing the applied voltage (not shown).

Figure 19:
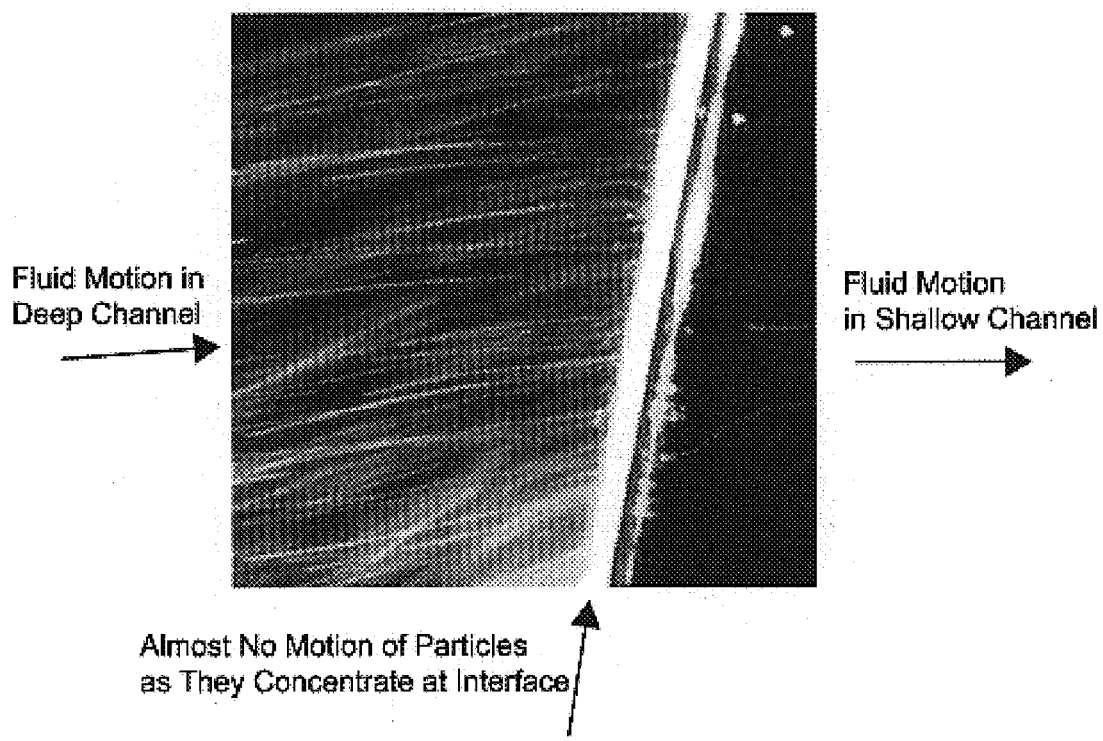
FIG. 19 illustrates experimental results showing that particles slowly travel parallel to the interface, concentrating uniformly at the interface edge and confirming the simulated behavior of particles as they encounter an interface at near-normal incidence.
Figure 20A:
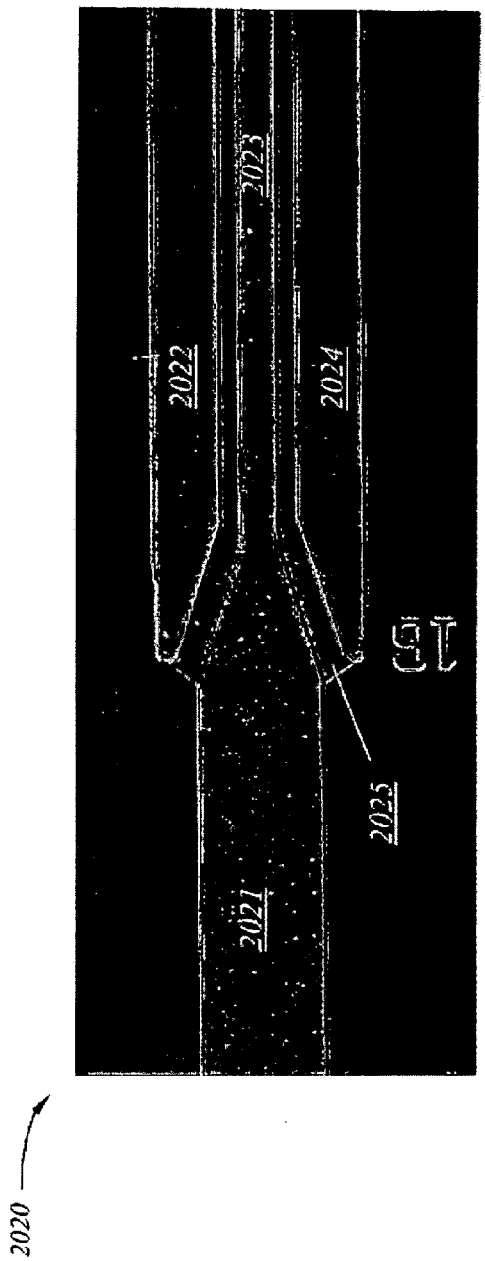
FIG. 20A illustrates an actual three-channel flow splitter/DEP system, as simulated in FIG. 13B, used for separating particles from a flow stream.

Experiments were also performed for a near-normally incident interface much like simulations shown in FIGS. 15 and 17, again with the 1-µm diameter fluorescent, polystyrene bead liquid suspension. The resulting particle behavior is shown in FIG. 19. Here, the 1-µm beads are trapped along the interface, as predicted by the simulation of FIGS. 17A-17D. Similarly, the simulation shown in FIG. 13A, was experimentally duplicated using the device shown in FIG. 20A constructed to include flow channel 2020 comprised of single entrance tube 2021 and three 50-µm deep exit tubes 2022, 2023 and 2024, wherein upper and lower exit tubes 2022 and 2024 are separated from entrance tube 2021 by single ridge 2025 forming a 5-µm deep section. High voltage electrodes were placed at either end of the flow channel separated by a distance of about 10.2-mm and the devices loaded with an aqueous buffer suspension of *Bacillus subtilis* particles. Flow was initiated, voltage was applied to the electrodes and the behavior of the moving bacteria was observed.

Figure 20D:
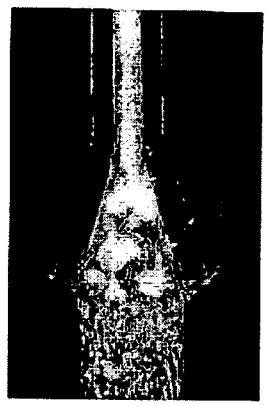
FIG. 20D shows the particle behavior after the field voltage is increased to 1000V.
Figure 20C:
FIG. 20C shows the behavior of the particles after the field voltage is increased to 300V.
Figure 20B:
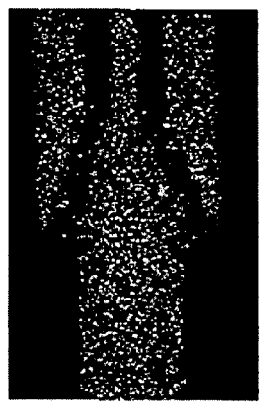
FIG. 20B shows particles flowing slowly from left to right under an applied DEP field of 10V, splitting into three channels.

At an applied voltage of 10V the behavior shown in FIG. 20B is observed. *Bacillus subtilis* particles flow slowly from left to right under the influence of the applied field, splitting into the three channels at the right. As the voltage is increased to 300V the bacteria is seen to travel rapidly in each of the three channels as seen FIG. 20C. However, in FIG. 20D when the voltage is increased to 1000V the bacteria are no longer able to penetrate the dielectrophoretic barrier at the upper and lower ridges and consequently, instead flow exclusively through the central channel.

We have thus demonstrated by both simulation and experiments that the interface angle is a powerful design parameter to select the filter/concentrator behavior. Other design parameters that are useful also include the depth ratio between deep and shallow sections. Furthermore, it should be possible to tune the filter/concentrator selecting the applied voltage—for which it would be potentially useful to place the device in a feedback control loop. It is also possible to place interface pairs in series or parallel to further tune the filter behavior.

Diagnostic System Embodiment

Figure 21:
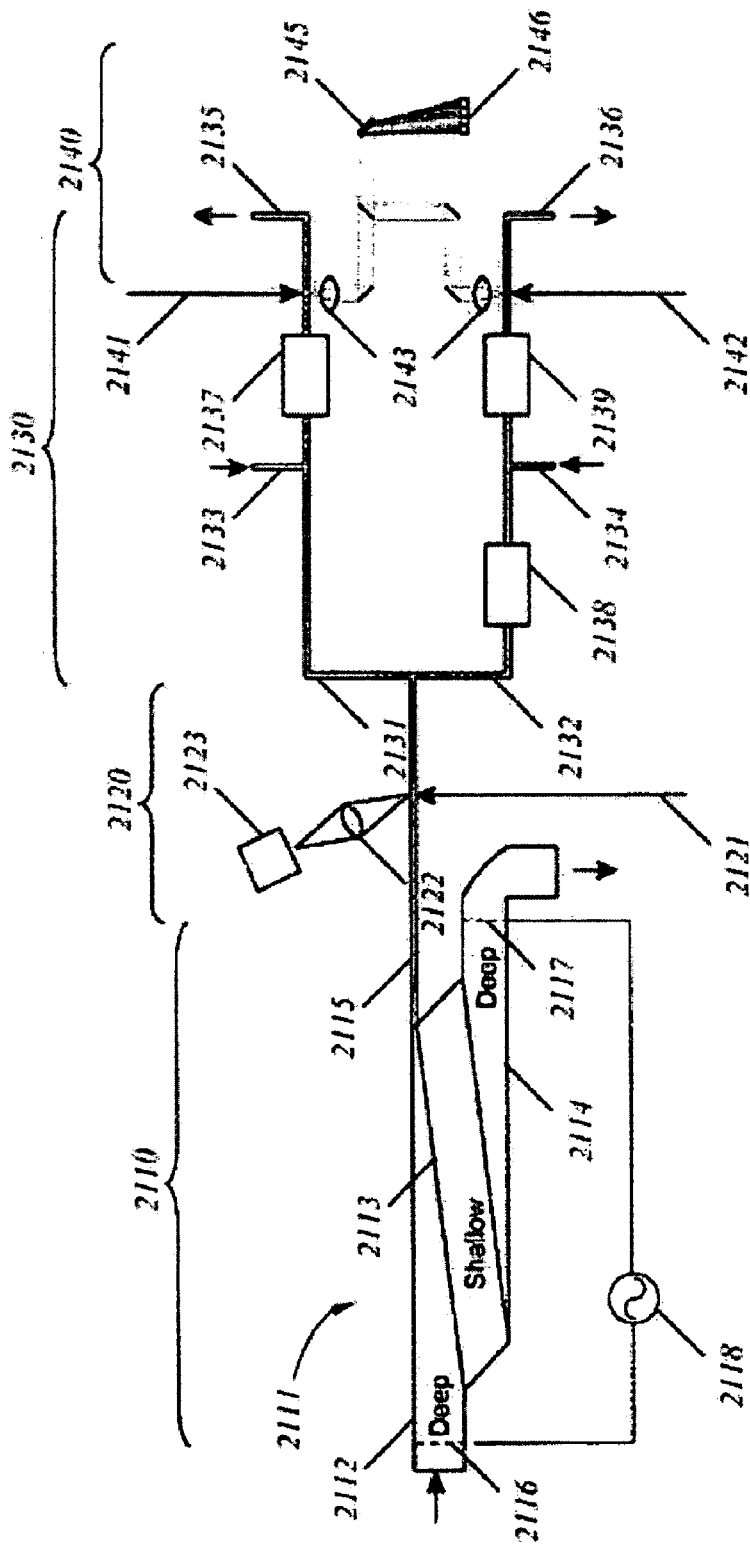
FIG. 21 shows a block diagram of a complete detection system in which the filter/concentrator directs particles to a triggered, downstream labeled antibody detection apparatus.

The filter/concentrator designs introduced in this document allow sample-handling capabilities that will enable diagnostics to be placed downstream. An example is shown in the block diagram of FIG. 21. Here, concentrator/analyzer system 2100, comprises separator module 2110, detector module 2120, multiplexer module 2130, and analyzer module 2140. Each of these modules is comprised as follows: separation module 2110 is comprised of flow channel 2111 having faceted regions 2112, 2113, and 2114, collector channel 2115, electrodes 2116 and 2117, and electrical source 2118; detection module 2120 is comprised of a diode laser (not shown) providing light source 2121, focusing optics 2122, and photomultiplier sensing means 2123; multiplexer module 2130 is comprised of branch channels 2131 and 2132, entry channels 2133 and 2134, exit channels 2135 and 2136 and several processing chambers 2137, 2138 and 2139; and analyzer module 2140 is comprised of two additional diode lasers (not shown) each of which provide light sources 2141 and 2142, focusing and beam addition optics 2143, and analyzer means 2144, itself comprising a grating 2145 and CCD detection array 2146. Concentrator/analyzer system 2100 operates by utilizing dielectrophoresis and the permeability discontinuity of the faceted channels regions of flow channel 2111 to trap and direct particles suspended in the effluent to a concentrated stream through collector channel 2115 that is easily interrogated using diagnostics, such as a scattering trigger and a labeled antibody mixing system, followed by laser-induced fluorescence detection of tagged pathogens. Any diagnostic device or apparatus can be similarly placed, such as chromatography separations followed by detection of separated fluid constituents. Moreover, the system can be deployed in a multiplicity of ways. We can use a single channel with two ports in order to provide the ability of trap and release suspended species. We can also direct flow to a third port in either continuous flow fashion or in trap-and-release mode, or we can add another channel at the back side of the facet so we have a four port system. Finally, additional downstream facets and channels can be added in order to provide any number of desired ports for further species separation/trapping and further analysis such as PCR, assays, such as immunoassays, flow cytometry, spectrography, and the like.

The above embodiments demonstrate the efficacy of the method for separation and concentration of individual classes of particles. The use of sequences of prisms can be used to sort and concentrate specific classes of particles based on polarizability, size, and conductance. For example, prisms with extreme incidence angles transition channels from deep regions to shallow regions in which the field strength (velocity) is larger than the input channel. Prisms with smaller incidence angles also transition channels from deep regions to shallow regions in which the field strength is larger than the input channel. However, the shallow regions will have a higher field strength when using smaller incidence angles than that for shallow regions produced using larger incidence angles. Therefore, serial combinations of prisms can be used to produce different values of local field strength at an interface, which, in turn, causes particles with different values of permeability to be filtered by the different interfaces. Any number of downstream channels can be constructed, each receiving a different class of particle. Although the velocity in each channel is different from the other, it remains substantially uniform locally.

It is emphasized, therefore, that at each faceted prism within the channel system, any local electrokinetic field can be chosen, provided and maintained even if we have only a single channel. Thus for a single applied potential, we can locally filter/concentrate/direct particles of different types in a single channel. Thus, a first channel prism faceted segment could, for example, interact with anthrax, while a second faceted segment could instead interact with an entirely different particle such as tire rubber, for instance. By chaining the channels and prism segments together, therefore, that system is capable of separating a plurality of unknown particles based solely on electrical properties of the particles and how finely the applied fields are graduated from one faceted segment to the next.

What is claimed is:

1. A filtering device, comprising:
    a dielectric base portion comprising an open flow channel formed therein, said open flow channel comprising connected channel regions,
wherein each of said channel regions comprise a predetermined depth, a uniform rectangular cross section, a longitudinal axis, and first and second side walls each aligned substantially parallel to said longitudinal axis,
wherein at least first and second channel regions intersect at a first intersection plane passing through an intersection between said respective first side walls and said respective second side walls of said at least first and second channel regions, and
wherein a normal to said first intersection plane is oriented at a first angle, $\theta_{11}$, with respect to said longitudinal axis of said first channel region, and oriented at a second angle, $\theta_{12}$, with respect to the longitudinal axis of said second channel region;
    said first channel region further comprising a first predetermined channel depth, $d_1$, said first predetermined channel depth providing a means for establishing a first average permeability, $\overline{\sigma}_1$, in said first channel region, wherein $0.75\sigma_1 < \overline{\sigma}_1 < 1.25\sigma_1$; and
    said second channel region further comprising a second predetermined channel depth, $d_2$, said second predetermined channel depth providing a means for establishing a second average permeability, $\overline{\sigma}_2$, in said second channel region, wherein $0.75\sigma_2 < \overline{\sigma}_2 < 1.25\sigma_2$,
wherein $\sigma_1$ and $\sigma_2$ are first and second predetermined design permeabilities, respectively proportional to $d_1$ and $d_2$, and related by a compatibility condition comprising $$\frac{\tan\theta_{11}}{\sigma_1} = \frac{\tan\theta_{12}}{\sigma_2},$$

and
wherein a fluid flowing from said first channel region into said second channel region and comprising a flux that is substantially uniform in said first channel region, remains substantially uniform in said second channel region;
    a first electrode disposed at an inlet of said open flow channel and second electrode disposed at an outlet of said open flow channel, said electrodes attached to an adjustable source of electrical energy; wherein said electrodes and said adjustable source of electrical energy are configured to provide a steady electrical field across each channel region rectangular cross section,
wherein said electric field transports a conduction fluid through said open flow channel, and wherein the electric field is further adjustable to impart a dielectrophoretic force to a particle suspended in said conduction fluid sufficient to inhibit said particle from passing said first intersection plane;
    a collection channel opening into said flow channel and disposed between said inlet and said outlet; and
    a dielectric cover portion disposed over said base portion.

2. The device of claim 1, wherein $\sigma_1 > \sigma_2$.

3. The device of claim 2, wherein said depth of said first channel region is between about 2 times and 1000 times greater then the depth of said second channel region.

4. The device of claim 1, wherein said means for establishing first and second permeabilities comprise providing a secondary structure disposed within either or both of said first and second channel regions.

5. The device of claim 2, wherein said first electrode is held at a potential more negative then said second electrode.

6. The device of claim 5, wherein said collection channel opens into said first channel region at a point distal to said inlet and adjacent said intersection of said first and second channel region respective second side walls.

7. The device of claim 1, wherein $\sigma_1 < \sigma_2$.

8. The device of claim 7, wherein said depth of said second channel region is between about 2 times and 1000 times greater then the depth of said first channel region.

9. The device of claim 7, wherein said means for establishing first and second permeabilities comprise providing a secondary structure disposed within either or both of said first and second channel regions.

10. The device of claim 7, wherein said first electrode is held at a potential more positive then said second electrode.

11. The device of claim 10, wherein said collection channel opens into said first channel region adjacent to said intersection of said first and second channel regions and to one of said side walls at a point distal to said inlet.

12. The device of claim 6 or claim 10, further comprising:
a third channel region intersecting said second channel regions at a second intersection plane passing through an intersection between said respective first side walls and said respective second side walls of said second and third channel regions, and wherein a normal to said second intersection plane is oriented at an angle, $\theta_{21}$, with respect to said longitudinal axis of said second channel region, and oriented at an angle, $\theta_{22}$, with respect to the longitudinal axis of said third channel region;

said third channel region further comprising a third predetermined channel depth, $d_3$, said third predetermined channel depth providing a means for establishing a third channel permeability, $\overline{\sigma}_3$, in said third channel region, wherein $0.75\sigma_3 < \overline{\sigma}_3 < 1.25\sigma_3$, wherein $\sigma_3$ is a third predetermined design permeability proportional to $d_3$, and related to said second predetermined design permeability by a compatibility condition comprising $$\frac{\tan\theta_{21}}{\sigma_2} = \frac{\tan\theta_{22}}{\sigma_3},$$

and
wherein a fluid flowing from said second channel region into said third channel region and comprising a flux that is substantially uniform in said second channel region remains substantially uniform in said third channel region.

13. The device of claim 12, wherein said depths of said first and said third channel regions are about equal.

14. The device of claim 12, wherein said means for establishing said third predetermined permeability comprises providing a secondary structure disposed within said third channel region.

15. The device of claim 13, wherein said collection channel opens into said second channel region adjacent to said intersection of said first and second channel regions and to one of said side walls at a point distal to said inlet.

* * * * *